United States Patent Office 3,062,872
Patented Nov. 6, 1962

3,062,872
PROCESS FOR RECOVERY OF ALKYL METHACRYLATES FROM SOLUTIONS THEREOF IN CORRESPONDING ALKYL ISOBUTYRATES
Alden E. Blood, David C. Hull, and Hugh J. Hagemeyer, Jr., Longview, Tex., assignors to Eastman Kodak Company, Rochester, N.Y., a corporation of New Jersey
No Drawing. Filed Oct. 16, 1961, Ser. No. 145,440
10 Claims. (Cl. 260—486)

This invention relates to a process for the economical recovery of methyl methacrylate as pure monomer from mixtures thereof in methyl isobutyrate.

It is known that alkyl isobutyrates can be dehydrogenated or oxidized at elevated temperatures to the corresponding alkyl methacrylates. For example, in E. L. McDaniel and H. S. Young, United States Patent No. 2,945,057, dated July 12, 1960, a vapor phase process is described wherein methyl isobutyrate is heated at 400°–800° C., in the presence of an activated alumina, whereby a substantial amount of the methyl isobutyrate is dehydrogenated to methyl methacrylate. The reaction gases therefrom are condensed to the liquid state and the methyl methacrylate is then recovered from the collected condensate by conventional distillation methods. However, the conversion is relatively low so that the condensate contains only about from 5–40 percent by weight of the methyl methacrylate, the remainder being unreacted methyl isobutyrate with insignificant amounts of impurities and reaction by-products. At such dilute concentrations, recovery of methacrylate resins therefrom by distillation techniques is not economical. This is so because methyl methacrylate, for example, boils at approximately 100° C., while methyl isobutyrate boils at approximately 93° C. Thus, a very efficient column is required and all the methyl isobutyrate must be removed before the methyl methacrylate can be recovered as pure monomer. This makes necessary long periods of time in the still which raises operating costs and leads to extensive polymerization even when polymerization inhibitors and reduced pressures are used.

We have now found that alkyl methacrylates can be separated economically and in substantially pure monomer form from mixtures thereof with alkyl isobutyrates originating as crude product streams from the dehydrogenation reactor wherein the alkyl isobutyrates are partially converted into the corresponding alkyl methacrylates with a minimum of by-products, by the steps comprising (1) removing the by-products and impurities, (2) subjecting the purified mixtures to polymerization conditions whereby the alkyl methacrylates are converted to the corresponding homopolymers, (3) separating the said polymers from the polymerized mixtures, and (4) depolymerizing the said polymers by heating them above their decomposition temperatures and fractionating the resulting distillate to obtain substantially 100 percent pure monomeric alkyl methacrylates. The above described process is particularly efficacious for the separation of pure monomeric methyl methacrylate from crude product mixtures or streams produced in the dehydrogenation of methyl isobutyrate.

It is, accordingly, an object of the invention to provide an improved method for recovering monomeric alkyl methacrylates from mixtures thereof with alkyl isobutyrates, and more particularly for recovering the monomers from mixtures wherein the concentration of the monomer is only from 5–40 percent based on the weight of the mixture as in crude product streams originating from the dehydrogenation of said alkyl isobutyrates.

It is another object of the invention to provide an improved and economical process for recovering monomeric methyl methacrylate from such crude product streams coming from the dehydrogenation of methyl isobutyrate.

It is also another object of the invention to homopolymerize the monomeric methyl methacrylate contained in said crude product streams and separate the formed polymer therefrom.

Another object of the invention is to depolymerize the polymer and recover the monomeric methyl methacrylate, which forms, by fractionation of the distillate from the depolymerization process.

Other objects will be apparent from the description and claims which follow.

In accordance with the preferred procedure of the invention, the methyl methacrylate containing feed, from which the monomer is to be recovered, is obtained by passing methyl isobutyrate over a heavy metal oxide at elevated temperatures whereby a substantial amount of the methyl isobutyrate is dehydrogenated primarily to the above-mentioned monomer. Usually the crude or raw product feed from the dehydrogenator contains by weight from 10–25 percent of monomeric methyl methacrylate, from 1–2 percent of methyl acrylate, and small amounts (less than 1 percent) of formaldehyde, methanol, isobutyric acid, and traces of impurities, the remainder to make 100 percent being unreacted methyl isobutyrate. In some cases, the amount of methyl methacrylate may be as low as 5 percent and in others up to about 40 percent of the crude product feed. For recovery of the pure methyl methacrylate from the above crude product streams or feeds by the method of the invention, the isobutyric acid and formaldehyde are removed by washing the crude product with dilute caustic solution, e.g., from 1–10 percent aqueous sodium or potassium hydroxide, followed by a water wash to remove traces of caustic. The wet crude is topped in a 100-plate still to remove methyl acrylate. An inhibitor of the phenolic type such as phenol, cresol, xylenol, resorcinol, etc., but preferably hydroquinone, is added in amount of from 0.05–1.0 percent by weight of crude stream prior to distillation. About 7 percent of the still charge is removed overhead. The base product is dry and contains only a very small amount of methyl acrylate, usually about 0.01 percent. The product from the 100-plate column is flashed through a short column to remove inhibitor and is then fed to the polymerization reactor. A peroxide catalyst is added and the solution heated to reflux until practically all of the methyl methacrylate is polymerized. The polymer solution is fed to a short flash pot and methyl isobutyrate is removed until the polymer solution contains about 40 percent solids. The concentrated polymer solution is then fed to a heated ball mill at about 300° C. where the remaining methyl isobutyrate is flashed and then the poly-(methyl methacrylate) is depolymerized. Alternatively, the concentrated polymer solution can be spray dried and the dry polymer fed to the ball mill. The methyl methacrylate monomer from the ball mill is refined by distillation to obtain pure monomer. The recovered methyl isobutyrate is recycled. The overall recovery of methyl methacrylate is 85–95 percent. The decomposition temperature can vary from about 200°–350° C. and can be carried out at pressures that are normal or above or below atmospheric.

The only limitation of importance is the methyl acrylate concentration. The methyl acrylate concentration in the polymer must be less than one percent for economical operation. As the methyl acrylate concentration increases, the yield of methyl methacrylate on depolymerization decreases and the process becomes less economical. It is thought that poly(methyl acrylate) prevents the ready depolymerization of poly(methyl methacrylate) by virtue of the existence of a copolymer between methyl methacrylate and methyl acrylate being formed during the polymerization rather than a mixture of the two homopolymers. It is known that poly(methyl acrylate) gives very poor conversions to monomer on depolymerization. Thus a methyl methacrylate polymer chain containing methyl acrylate will only depolymerize to the methyl acrylate portion and then stop. It is an unexpected result that only 3 percent of methyl acrylate will have an adverse effect on the depolymerization of poly(methyl methacrylate).

The order of purification of the crude methyl methacrylate solution is not critical except for the removal of methyl acrylate. The formaldehyde, isobutyric acid, etc., can also be removed from the final product, if desired. The presence of these materials does not bother the polymerization. The rate of polymerization is of little consequence from the standpoint of carrying out the process except that the more rapid the polymerization, then the more economical the process. Any polymerization catalyst can be used or it may be omitted altogether. The rate of polymerization with heat alone as the initiator, however, is very slow at atmospheric pressure. The rate can be improved by carrying out the polymerization in a pressure vessel. Any of the depolymerization procedures known to the art can also be applied for depolymerizing the polymer. The use of a ball mill for the depolymerization is a convenient method and does have the advantage of being able to handle a variety of feed with respect to physical form. The process steps of the invention can be carried out batchwise or by a continuous mode of operation.

Advantageously, the polymerizations are carried out under an inert atmosphere such as nitrogen at about from 50° C. to the refluxing temperature of the mixture (approximately from 93°–100° C.) but preferably at about 80–90° C. over a period of 10–30 hours. Suitable polymerization catalysts include the peroxides such as hydrogen peroxide, benzoyl peroxide, acetyl peroxide, acetyl benzoyl peroxide, urea peroxide, t-butyl hydroperoxide, ammonium, sodium and patassium persulfates, and the like. The quantity of catalyst employed can be varied from about 0.001 to 2 percent or more, based on weight of monomers to be polymerized. Alternatively, the refined and colorless solution of methyl methacrylate in methyl isobutyrate can be mixed with water, surfactants such as alkali metal salts of alkyl acid sulfates, or similar salts of fatty acids of 12–20 carbon atoms, or similar salts of alkane sulfonic acids, etc., and peroxide catalyst, or redox type catalysts containing a sulfite compound such as sodium or potassium bisulfite, etc., and polymerized in emulsion form to give poly(methyl methacrylate) of a higher inherent viscosity than can be obtained at the same temperature by solution polymerization. Also, the emulsion method of polymerization has been found more efficient at concentrations of 5 percent or less of the methacrylate ester than the method of solution polymerization. When emulsion polymerizations are employed the surfactant can vary from 1–5 percent, based on the weight of the reactants, and the sulfite compound in the redox system can be approximately equal to the peroxide compound therein. If desired, the polymerization can also be carried out directly with the raw feed from the dehydrogenation reactors, but in this case the resulting polymer will be of lower quality with respect to color, odor and hardness. The poly(methyl methacrylate) can also be isolated from the polymerization reaction mixtures by spray drying and the methyl isobutyrate vapors then recycled, or a solvent such as toluene, isobutyl acetate, etc., can be added to the mixture and the methyl isobutyrate then removed by distillation to give a residual solution of poly(methyl methacrylate) in toluene or isobutyl acetate, etc. The above solutions and emulsions containing poly(methyl methacrylate) can be used directly in many applications such as coating compositions, impregnating materials, etc., with or without dyes, fillers, pigments, softeners, and the like; however, as indicated previously the primary utility is the production of pure monomeric methyl methacrylate from the isolated polymers. This purified monomer can then be employed as an intermediate for the production of various high quality monomeric compounds and polymers having particularly advantageous physical properties.

*Example 1*

A. Feed product from the dehydrogenation reactor which contained by weight 17.7 percent methyl methacrylate and 1.8 percent methyl acrylate was washed with an equal volume of 5 percent sodium hydroxide followed by an equal volume of water. The washed product was distilled in a 100-plate column at a 2 percent take-off rate until 6.4 percent of the charge had been removed overhead. Hydroquinone was used as a polymerization inhibitor in concentrations of 0.5 percent with respect to the methyl methacrylate. The base product contained 17.9 percent methyl methacrylate and 0.01 percent methyl acrylate. The dry base product was distilled through a 10-plate column at a 90 percent take-off rate to remove color and hydroquinone. The final product contained 18.0 percent methyl methacrylate and 0.02 percent methyl acrylate. The product was colorless and was free of isobutyric acid and formaldehyde.

B. A total of 1,587 g. of feed product from the methyl isobutyrate dehydrogenation unit, which contained 17.7 percent methyl methacrylate, 1.8 percent methyl acrylate, and small amounts of formaldehyde, isobutyric acid, and other materials, was washed with an equal volume of 5 percent sodium hydroxide solution followed by an equal volume of water. The wet crude, with 0.1 percent hydroquinone added, was distilled in a 100-plate column at a 2 percent take-off rate until approximately 7 percent of the charge was removed overhead. The overhead product is wet methyl isobutyrate rich in methyl acrylate. The dry base product contained 0.01 percent methyl acrylate and 19.1 percent methyl methacrylate. The base product was distilled through a 10-plate column at a 90 percent take-off rate to give a colorless overhead product free of inhibitor. A take-off of 6.4 percent and 7 percent has been indicated in above A and B for removing the by-product methyl acrylate. However, the overall range for this operation can be varied, if desired, from about from 3–10 percent.

*Example 2*

To a 100-ml. pressure bottle was charged 100 g. of the raw product directly from the dehydrogenation reactor (which contained 19.3 percent by weight methyl methacrylate), 200 ml. distilled water, 1 g. sodium persulfate, and 1 g. sodium dodecyl-sulfate. The air was displaced with nitrogen and the stoppered bottle was heated with shaking at 50° C. for 48 hours. The resulting emulsion was removed, precipitated with saturated sodium chloride solution and the mixture steam-distilled to remove 53.5 g. of organic material. The solid polymer was removed, washed, filtered, and dried to give 20.2 g. of poly(methyl methacrylate). The inherent viscosity of the polymer was 0.44 measured in toluene (0.5 g. per 100 ml.) at 25° C.

*Example 3*

To a 5-liter, 3-neck flask equipped with a paddle stirrer, condenser, and thermometer well was added 1000 g. of feed purified as in Example 1 (which contained 15.8 percent methyl methacrylate and 0.1 percent methyl acrylate) and 0.7 g. benzoyl peroxide (0.44 percent based on methyl methacrylate). The system was flushed with nitrogen and heated to 74° C. with stirring. After 23 hours, the methyl methacrylate concentration was 3.8 percent and after 31 hours it was 1.2 percent as determined by pyridine-sulfate-dibromide titration. The methyl isobutyrate was stripped until the base contained 35 percent solids (547 g. distilled). The distillate contained 1.9 percent methyl methacrylate, 0.1 percent methyl acrylate, and 98.0 percent methyl isobutyrate. To the residue was added 600 ml. (516 g.) of toluene and the mixture distilled in a 100-plate column at a 20 percent take-off rate. Distillation was continued until the base contained 30 percent solids. A total of 770 g. of pure methyl isobutyrate was recovered plus a fraction containing methyl isobutyrate and toluene. The polymer solution was colorless. The inherent viscosity of the isolated polymer was 0.19 (0.5 g. per 100 ml. of toluene at 25° C.).

*Example 4*

In a run carried out as described in Example 3, using 6,181 g. of feed purified as in Example 1 and which contained 20 percent methyl methacrylate, the polymerization was carried out with 0.4 percent acetyl peroxide (with respect to methyl methacrylate) at 76° C. for 78 hours. The reaction solution after this time contained 2.9 percent residual monomer. The toluene solution prepared as in Example 3 was colorless and haze-free. The inherent viscosity of the isolated polymer was 0.21 (0.5 g. per 100 ml. of toluene at 25° C.).

*Example 5*

To a 200-ml. pressure bottle was charged 100 g. of raw feed directly from the dehydrogenator (which contained 15 percent methyl methacrylate), 0.4 percent acetyl peroxide (with respect to methyl methacrylate), and the air was displaced with nitrogen. The stoppered bottle was heated at 65° C. with shaking for 22 hours. After this time, the residual monomer concentration was 4.6 percent. The isolated polymer has an inherent viscosity of 0.20 (0.5 g. per 100 ml. of toluene at 25° C.).

*Example 6*

In a run carried out as in Example 5 using feed directly from the dehydrogenator (which contained 15 percent methyl methacrylate), the polymerization was carried out with 0.4 percent ammonium persulfate (with respect to methyl methacrylate) at 73° C. for 22 hours. After this time, the residual monomer concentration was 11.1 percent. The inherent viscosity of the isolated polymer was 0.50 (0.5 g. per 100 ml. of toluene at 25° C.).

*Example 7*

In a run carried out as described in Example 5 using feed obtained directly from the dehydrogenator (which contained 16.2 percent methyl methacrylate), the polymerization was carried out with 0.4 percent hydrogen peroxide (with respect to methyl methacrylate) at 83° C. for 22 hours. After this time, the residual monomer concentration was 5.8 percent. The inherent viscosity of the isolated polymer was 0.26 (0.5 g. per 100 ml. of toluene at 25° C.).

*Example 8*

In a run carried out as described in Example 7, the polymerization was carried out with 0.4 percent $\alpha,\alpha'$-azodiisobutyronitrile (with respect to methyl methacrylate) at 83° C. for 22 hours. After this time, the residual monomer concentration was 5.9 percent. The inherent viscosity of the isolated polymer was 0.26 (0.5 g. per 100 ml. of toluene at 25° C.).

*Example 9*

To 4,364 g. of feed prepared as in Example 1B, which contained 19.1 percent methyl methacryate and 0.2 percent methyl acrylate, was added 3.3 g. benzoyl peroxide (0.075 percent based on total weight) and the solution heated with stirring under a nitrogen atmosphere at 75° C. for 30 hours. The residual methyl methacrylate concentration was 1.2 percent. The methyl isobutyrate was removed by a flash distillation until the polymer concentration was 40 percent. The solid polymer was then isolated by spray drying to give 782 g. of poly- (methyl methacrylate) containing less than 1.0 percent poly(methyl acrylate).

*Example 10*

The polymerization was carried out using feed containing 12.2 percent methyl methacrylate by adding 0.34 percent benzoyl peroxide and heating the mixture at reflux for 4.5 hours. The residual monomer concentration was 1.5 percent. The polymer solution was concentrated to 40 percent solids by flash distillation.

*Example 11*

To a 500-ml. round-bottom 3-neck flask equipped with a metal paddle stirrer and a distillation head was added 143 g. of poly(methyl methacrylate) prepared as in Example 9. The polymer was heated with stirring to 300° C. Within 45 minutes 75 g. (52.5 percent) of distillate was collected and after 3 hours of heating a total of 136.0 g. (95.2 percent) of distillate was collected. The residue in the flask weighed 2.1 g. so that 138.1 g. (96.8 percent) of the polymer charged was accounted for. The distillate was 97.8 percent methyl methacrylate by chromatographic analysis. Distillation in a 15-plate column at a 30 percent take-off rate gave 100 percent methyl methacrylate. The overall recovery of methyl methacrylate from the polymer was 93 percent.

*Example 12*

This example shows the effect of poly(methyl acrylate) on the depolymerization of poly(methyl methacrylate).

To a 500-ml. round-bottom 3-neck flask equipped as in Example 4 was added 82.4 g. of poly(methyl methacrylate) containing about 3 percent poly(methyl acrylate). The flask was heated to 300° C. with stirring. After 45 minutes, 36 percent of the polymer was depolymerized and after 3 hours only 88.6 percent of the polymer was depolymerized.

While the above examples are directed specifically to the recovery of methyl methacrylate from solutions thereof in methyl isobutyrate at concentrations of from 5–40 percent of the methacrylate ester, it will be understood from the preceding description that it is also within the scope of the invention to recover in similar manner other methacrylate esters coming within the general formula:

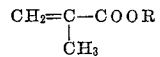

wherein R represents an alkyl group of from 1–4 carbon atoms, e.g., ethyl methacrylate from solutions thereof in ethyl isobutyrate, propyl methacrylate from solutions thereof in propyl isobutyrate, isobutyl methacrylate from solutions thereof in isobutyl isobutyrate, etc. Relatively small differences in the boiling points of the components in each of the above-mentioned systems is a common feature as shown below:

|  | Methylacrylate Ester, B.P., °C. | Isobutyrate Ester, B.P., °C. |
|---|---|---|
| Methyl | 100 | 93 |
| Ethyl | 117 | 111.7 |
| Propyl | 141 | 135.4 |
| Isobutyl | 155 | 148.7 |

Thus, the process of the invention would be equally applicable to all of these methacrylate ester-isobutyrate ester combinations.

The feed stock containing the methacrylate ester in the isobutyrate ester can be crude product as illustrated in Examples 2 and 5–8, or a refined stream as illustrated in Examples 3 and 4. To produce a polymer of the highest quality, it is necessary to refine the crude stream as illustrated in Example 1. The presence of methyl acrylate makes films cast from the polymer product too soft for use as a high quality protective coating. The presence of isobutyric acid leads to residual odor in the final product. Formaldehyde causes plugging of process equipment and must be removed.

The advantages realized by the practice of the invention for the recovery of methacrylate esters from solutions in the corresponding isolbutyrate ester have been pointed out previously. It was also pointed out that a unique feature of the invention is the production of useful polymer by polymerization in the isobutyrate ester solution. The utilization of the polymer thus prepared as a protective coating is illustrated below where some properties important for lacquer resins are shown for the polymer produced according to Examples 2 and 3. These properties are compared to the properties of a commercial methacrylate lacquer resin known as "Acryloid A 101."

| Example | Inherent Viscosity a | Hardness | | Tensile Strength, p.s.i. | Elongation, Percent |
|---|---|---|---|---|---|
| | | Sward | Pencil | | |
| 2 | 0.44 | 42 | H | 6,380 | 9.6 |
| 3 | 0.19 | 27 | H | 2,800 | 7.5 |
| A-101 | 0.16 | 31 | 4H | 1,100 | 5.0 | a 0.5 g. resin per 100 ml. of toluene at 25° C.

All of the above resin were compatible in 50–50 percent mixtures of the resin with cellulose butyrate and with cellulose acetate. From the above data, it will be seen that polymers prepared in accordance with the invention compare well with the commercial product in several respects and in several respects are superior thereto.

This invention has been described in detail with particular reference to preferred embodiments thereof, but it will be understood that variations and modifications can be effected within the spirit and scope of the invention as described hereinabove and as defined in the appended claims.

What we claim is:

1. In the process of recovering an alkyl methacrylate of the general formula:

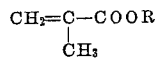

wherein R represents an alkyll group of from 1–4 carbon atoms, from a 5–40 percent by weight solution thereof in the corresponding alkyl isobutyrate said solution having been formed by the partial dehydrogenation of said alkyl isobutyrate, the step which comprises heating the said solution in the presence of a polymerization catalyst whereby a homopolymer of the said alkyl methacrylate iis formed.

2. In the process of recovering an alkyl methacrylate of the general formula:

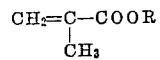

wherein R represents an alkll group of from 1–4 carbon atoms, from a 5–40 percent by weight solution thereof in the corresponding alkyl isobutyrate, said solution having been formed by the partial dehydrogenation of said alkyl isobutyrate, the steps which comprise (a) heating the said solution in the presence of a polymerization catalyst whereby a homopolymer of the said alkyl methacrylate is formed, and (b) isolating and heating the said homopolymer above its decomposition temperature to form the corresponding monomer.

3. In the process of recovering methyl methacrylate from a 5–40 percent by weight solution thereof in methyl isobutyrate, said solution having been formed by the partial dehydrogenation in the vapor phase of methyl isobutyrate, the step which comprises heating the said solution in the presence of a polymerization catalyst whereby a homopolymer of methyl methacrylate is formed.

4. In the process of recovering methyl methacrylate from a 5–40 percent by weight solution thereof in methyl isobutyrate, said solution having been formed by the partial dehydrogenation in vapor phase of methyl isobutyrate, the steps which comprise (a) heating the said solution in the presence of a polymerization catalyst whereby a homopolymer of methyl methacrylate is formed, and (b) isolating and then heating the said homopolymer at 200°–350° C. to form monomeric methyl methacrylate.

5. The process of claim 1 wherein the said solution is purified prior to said polymerization by washing with aqueous alkali metal hydroxide and fractionating the washed solution in the presence of a phenolic polymerization inhibitor.

6. The process of claim 2 wherein the said solution is purified prior to said polymerization by washing with aqueous alkali metal hydroxide and fractionating the washed solution in the presence of a phenolic polymerization inhibitor.

7. The process of claim 3 wherein the said solution is purified prior to said polymerization by washing with aqueous sodium hydroxide and fractionating the washed solution in the presence of hydroquinone.

8. The process of claim 4 wherein the said solution is purified prior to said polymerization by washing with aqueous sodium hydroxide and fractionating the washed solution in the presence of hydroquinone.

9. The process of claim 3 wherein the said solution contains from 10–25 percent by weight of the said methyl methacrylate.

10. The process of claim 4 wherein the said solution contains from 10–25 percent by weight of the said methyl methacrylate.

No references cited.